United States Patent
Kim et al.

(10) Patent No.: US 7,039,327 B2
(45) Date of Patent: May 2, 2006

(54) SELF-HEALING APPARATUS AND METHOD OF OPTICAL RECEIVER

(75) Inventors: Sang-Ho Kim, Seoul (KR); Yun-Je Oh, Suwon-shi (KR); Seong-Taek Hwang, Pyeongtak-shi (KR); Jun-Ho Koh, Seongnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 09/945,895

(22) Filed: Sep. 4, 2001

(65) Prior Publication Data

US 2002/0027694 A1    Mar. 7, 2002

(30) Foreign Application Priority Data

Sep. 5, 2000    (KR) ................ 2000-52343

(51) Int. Cl.
- H04B 10/00    (2006.01)
- H04B 10/06    (2006.01)
- H03K 11/00    (2006.01)
- H04L 25/60    (2006.01)
- H04L 25/64    (2006.01)

(52) U.S. Cl. .............. 398/202; 398/208; 398/155; 375/214

(58) Field of Classification Search .......... 398/202, 398/204, 207, 208, 209, 154, 155; 375/215, 375/214; 370/395.62; 327/165
See application file for complete search history.

(56) References Cited

U.S. PATENT DOCUMENTS

| | | | |
|---|---|---|---|
| 4,122,405 A * | 10/1978 | Tietz et al. ............ | 331/1 A |
| 5,774,002 A | 6/1998 | Guo et al. ............ | 327/165 |
| 5,889,828 A * | 3/1999 | Miyashita et al. ...... | 375/374 |
| 6,549,572 B1 * | 4/2003 | Anderson et al. ...... | 375/225 |

FOREIGN PATENT DOCUMENTS

| | | |
|---|---|---|
| EP | 0342010 A2 | 11/1989 |
| EP | 0878926 A2 | 11/1998 |

* cited by examiner

Primary Examiner—M. R. Sedighian
Assistant Examiner—Nathan Curs
(74) Attorney, Agent, or Firm—Cha & Reiter, LLC

(57) ABSTRACT

Disclosed is a self-healing apparatus and method of an optical receiver that is capable of avoiding error due to temperature variation in the optical receiver when determining the bit rate. The apparatus includes an optoelectric converting unit for converting an input optical signal into an electrical signal; an amplifying unit for amplifying the electrical signal outputted from the optoelectric converting unit; a bit rate discriminating unit for exclusively OR'ing the electrical signal with a delay signal that is delayed from the amplified receiving signal by a predetermined time, thereby outputting a recognition signal; a clock/data reproducing unit for receiving the electrical signal, and for reproducing clocks and data based on a reference clock; a bit rate signal generating unit for generating the reference clock in response to a bit rate change signal; a temperature sensing unit for outputting a temperature sensing signal that is indicative of the internal temperature of the optical receiver; and, a control unit for determining the bit rate of the receiving signal based on a value selected from temperature-dependent voltage level variation values that are previously stored, on the basis of the voltage level of the recognition signal outputted from the bit rate discriminating unit and the internal temperature of the optical receiver corresponding to the temperature sensing signal, and for outputting the bit rate change signal based on the determined bit rate.

9 Claims, 4 Drawing Sheets

SELF-HEALING APPARATUS AND METHOD OF OPTICAL RECEIVER

CLAIM OF PRIORITY

This application makes reference to and claims all benefits accruing under 35 U.S.C. Section 119 from an application entitled, "SELF-HEALING APPARATUS AND METHOD OF OPTICAL RECEIVER," filed in Korean Industrial Property Office on Sep. 5, 2000, and there duly assigned Ser. No. 00-52343.

BACKGROUND OF THE INVENTION

1. Field of the Invention

The present invention relates to optical communication systems, and more particularly to the optical receiver of an optical cross-connect device.

2. Description of the Related Art

In an optical communication system, an optical cross-connect device is typically installed at an intermediate node connecting together the upper node, such as a central base station, and the lower node, such as a subscriber. In addition to the basic functions of transferring and allocating channel signals, the optical cross-connect device plays viable functions of optimizing the data traffic in an optical network and the growth of the network, while improving the abnormal congestion and survivability of the network. In particular, an optical cross-connect device is used in a wavelength division multiplexing (WDM) system and typically includes a demultiplexer, an optical receiver, a cross-connect switch, a controller, an optical transmitter, and a multiplexer.

A conventional receiver in a multi-channel optical communication system typically operates at a particular predetermined bit rate. Hence, the receiver is bit-rate specific. There are diverse transfer formats, known as "protocols," that are available in optical communication systems. For example, representative transfer formats include SDH/SONET (Synchronous Digital Hierarchy/Synchronous Optical NETwork), FDDI (Fiber Distributed Data Interface), ESCON (Enterprise Systems CONnectivity), optical fiber channel, gigabit Ethernet, and ATM (Asynchronous Transfer Mode). These different protocols provide diverse bit rates of 125 Mb/s, 155 Mb/s, 200 Mb/s, 622 Mb/s, 1,062 Mb/s, 1.25 Gb/s, and 2.5 Gb/s, respectively.

As mentioned above, optical signals may be inputted to the optical receiver of an optical cross-connect device at diverse bit rates. To this end, the optical receiver is provided with a self-healing means for the bit rate, such that it has the flexibility to meet diverse is protocols with different bit rates. Various mechanisms are known to process optical signals in a bit-rate independent manner.

FIG. 1 is a block diagram illustrating the configuration of a conventional self-healing apparatus employed in an optical receiver. As shown in FIG. 1, the conventional apparatus includes an optoelectric converting unit 10 for converting an input optical signal into an electrical signal as a receiving signal; an amplifying unit for amplifying the receiving signal outputted from the optoelectric converting unit 10; and, a bit rate discriminating unit 30 for outputting a bit-rate sensing signal generated by exclusively OR'ing the receiving signal with a delay signal generated by delaying the amplified receiving signal by a predetermined time. The self-healing apparatus also includes a clock/data reproducing unit 40 for receiving the signal and reproducing clocks and data based on the reference clock; a bit rate signal generating unit 50 for generating the reference clock in response to a bit rate change signal received therein; and, a control unit 60 for determining the bit rate of the receiving signal based on the voltage level of the bit-rate sensing signal outputted from the bit rate discriminating unit 30 and for outputting the bit rate change signal based on the determined bit rate.

FIG. 2 is a flow chart illustrating a conventional self-healing procedure performed by the control unit. As shown in FIG. 2, the self-healing procedure involves the steps of determining whether there is an optical signal received in the optical receiver based on the formation of an LOS signal outputted from the amplifying unit 20 (Step S10); determining whether there is a change in the bit rate of the received optical signal based on the voltage level of a recognition signal generated in association with the received optical signal (Step S20), and, if it is determined at step S20 that there is a change in the bit rate, then outputting a bit rate change signal corresponding to the changed bit rate to the bit rate signal generating unit 50.

However, the conventional self-healing device, as described above, involves a high probability that errors will occur when determining the bit rate due to a temperature variation in the optical receiver, as there is no compensation means to address the temperature variation. That is, the DC level of the recognition signal is used as a reference for the determination of the bit rate, without providing any compensation associated with the temperature variation.

SUMMARY OF THE INVENTION

The present invention is directed to provide a self-healing apparatus and method of an optical receiver that is capable of avoiding errors caused by the temperature variation when determining the bit rate.

One aspect of the present invention provides a self-healing apparatus of an optical receiver which includes: an optoelectric converting unit for converting an input optical signal into an electrical signal as a receiving signal; an amplifying unit for amplifying the receiving signal outputted from the optoelectric converting unit; a bit rate discriminating unit for exclusively OR'ing the receiving signal with a delay signal delayed from the amplified receiving signal by a predetermined time, thereby outputting a recognition signal; a clock/data reproducing unit for receiving the receiving signal and reproducing clocks and data based on a reference clock; a bit rate signal generating unit for generating the reference clock in response to a bit rate change signal; a temperature sensing unit for outputting a temperature sensing signal indicative of the internal temperature of the optical receiver; and, a control unit for determining the bit rate of the receiving signal based on a value selected from temperature-dependent voltage level variation values, previously stored, on the basis of the voltage level of the recognition signal outputted from the bit rate discriminating unit and the internal temperature of the optical receiver corresponding to the temperature sensing signal, and for outputting the bit rate change signal based on the determined bit rate.

Another aspect of the present invention provides a self-healing method in an optical receiver, which includes a temperature sensing unit, a bit rate discriminating unit, and a clock/data reproducing unit. The method includes the steps of: determining whether an optical signal is received in the optical receiver based on the formation of an LOS signal; if so, determining whether the clock/data reproducing unit is in a stabilized state based on whether a locking signal is outputted from the clock/data reproducing unit; if so, detecting the current internal temperature of the optical receiver based on an internal temperature sensing signal outputted from the temperature sensing unit; detecting the level of DC outputted from the bit rate discriminating unit; determining the bit rate of the receiving signal based on the current internal temperature of the optical receiver detected at the current temperature detecting step and the DC level detected at the DC level detecting step, while using a predetermined table with variations in the DC level respectively depending on a different temperature; and, outputting a bit rate change signal based on the bit rate determined at the bit rate determining step to the clock/data reproducing unit.

Another aspect of the present invention includes a method for determining the bit rate of an optical signal using an optical receiver of the type having a temperature sensing unit, a bit rate discriminating unit, and a clock/data reproducing unit. The method comprising the steps of: determining whether or not the optical signal is detected in the optical receiver; converting the detected optical signal into an electrical signal; separating the electrical signal into a first part and a second part, the first part being forwarded to the bit rate discriminating unit and the second part being forwarded to the clock/data reproducing unit; determining whether the clock/data reproducing unit is in a stabilized state based on whether a locking signal is outputted from the clock/data reproducing unit; detecting the current internal temperature of the optical receiver via the temperature sensing unit if it is determined that the clock/data reproducing unit is in a non-stabilized state; detecting the level of DC outputted from the bit rate discriminating unit; and, determining the bit rate of the electrical signal based on the detected current internal temperature of the optical receiver and the detected DC level.

BRIEF DESCRIPTION OF THE DRAWINGS

The above advantages of the present invention will become more apparent by describing in detail preferred embodiments thereof with reference to the attached drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
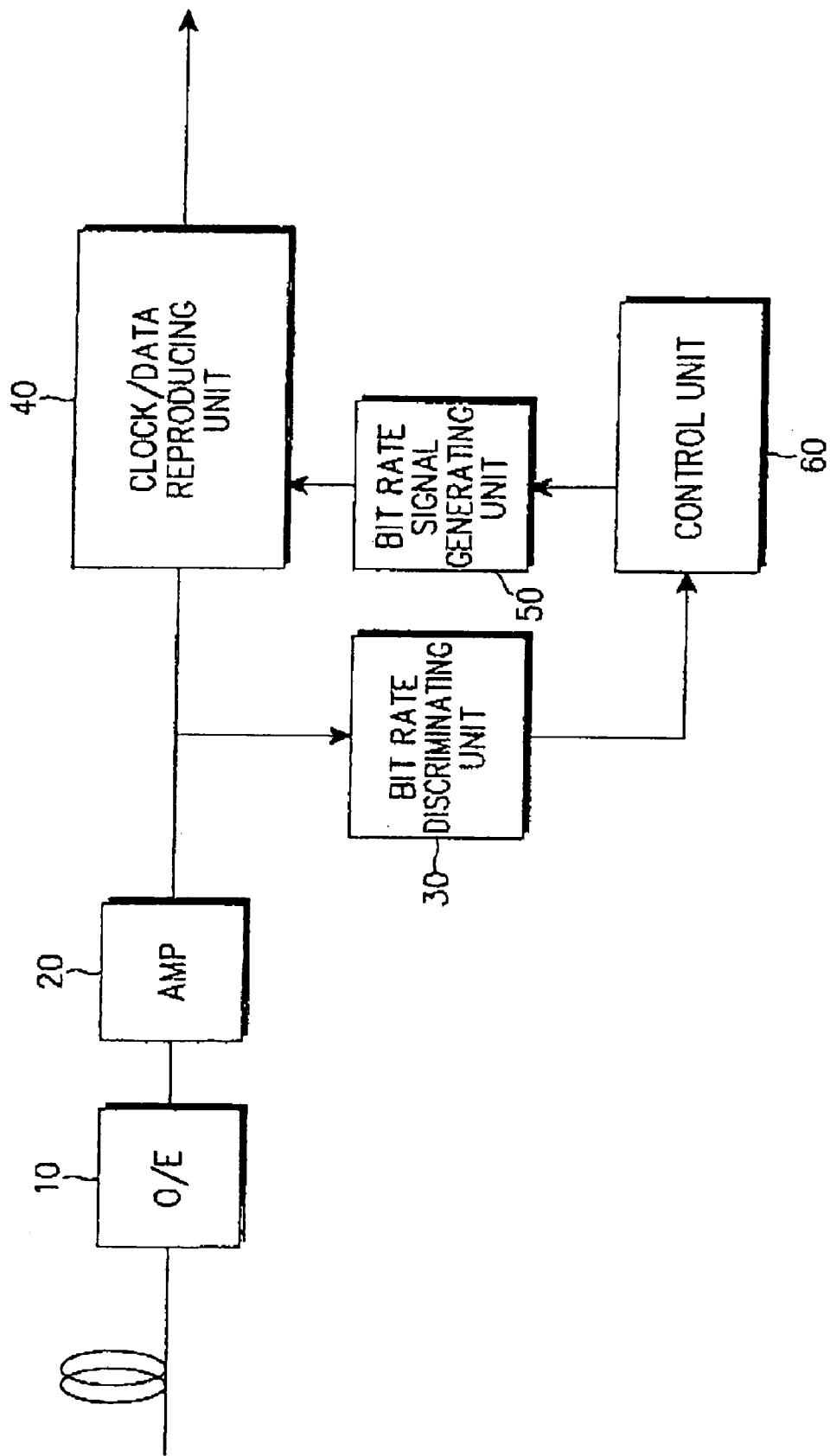
FIG. 1 is a block diagram illustrating the configuration of a conventional self-healing apparatus employed in an optical receiver.
Figure 2:
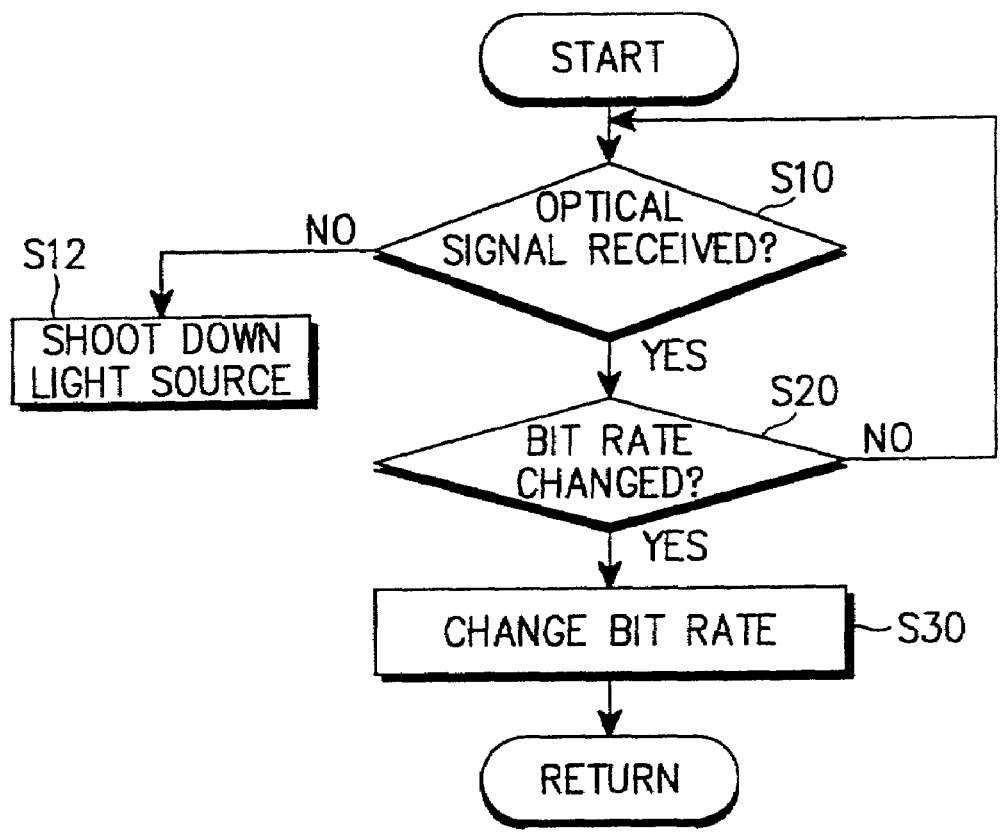
FIG. 2 is a flow chart illustrating the conventional self-healing procedure performed by the control unit.
Figure 3:
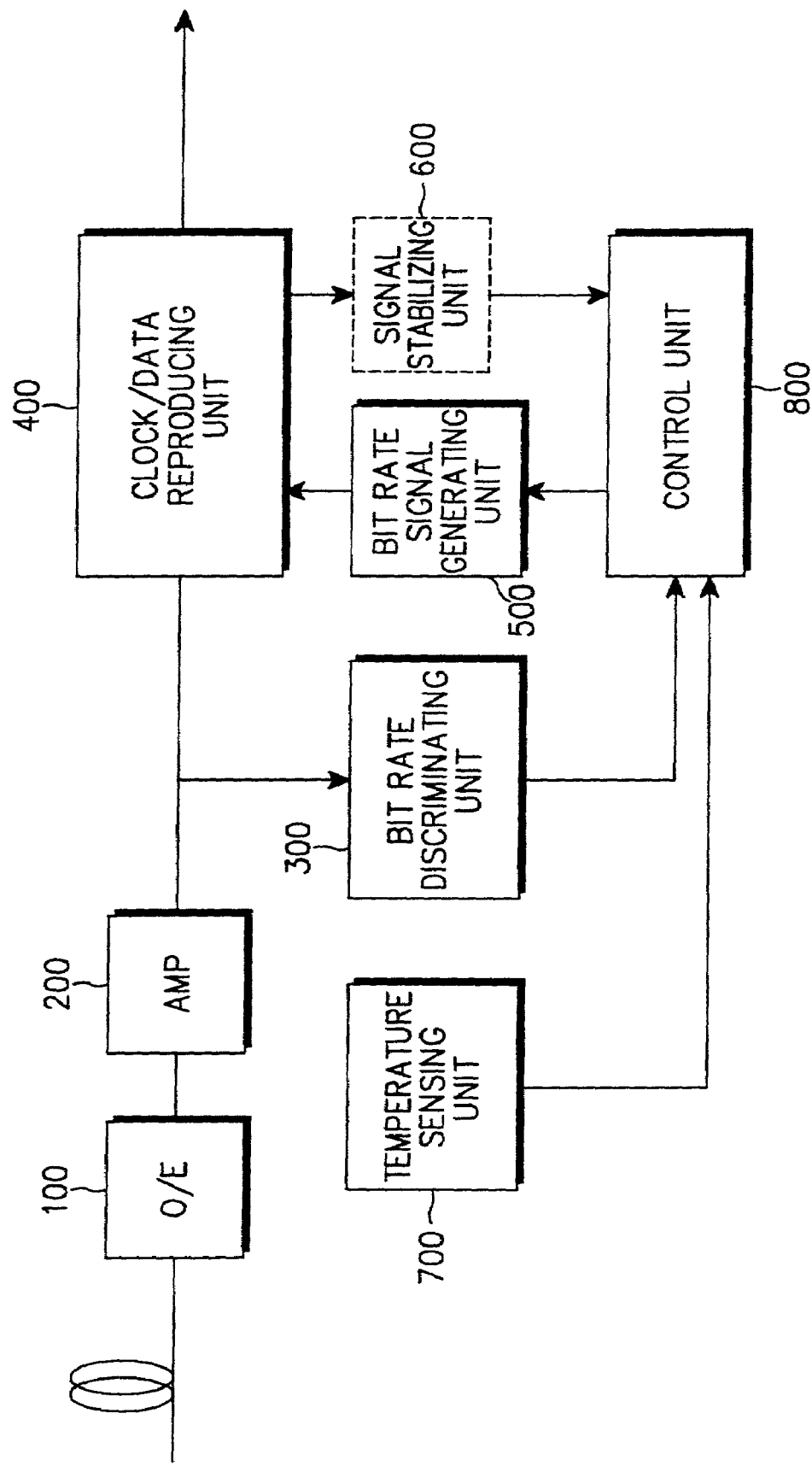
FIG. 3 is a block diagram illustrating the self-healing apparatus of an optical receiver according to a preferred embodiment of the present invention; and, FIG. 4 is a flow chart illustrating a self-healing method according to a preferred embodiment of the present invention.

FIG. 3 is a block diagram illustrating the self-healing apparatus of an optical receiver according to a preferred embodiment of the present invention. As shown in FIG. 3, the self-healing apparatus includes an optoelectric converting unit 100, an amplifying unit 200, a bit rate discriminating unit 300, a clock/data reproducing unit 400, a bit rate signal generating unit 500, a signal stabilizing unit 600, a temperature sensing unit 700, and a control unit 800.

In operation, the optoelectric converting unit 100 converts an input optical signal into an electrical signal. The amplifying unit 200 amplifies the converted electrical signal outputted from the optoelectric converting unit 100.

Thereafter, the converted electrical signal is separated into two parts, which may be substantially equal in magnitude. One part is forwarded to the bit-rate discriminating unit 300, and the other part of the converted electrical signal is applied directly to the clock/data reproducing unit 400. The bit rate discriminating unit 300 exclusively OR's the converted electrical signal with a delay signal that is generated by delaying the converted electrical signal by a predetermined time, thus generating an output signal indicative of the bit rate of the converted electrical signal (hereinafter "recognition signal").

At the same time, the temperature sensing unit 700 outputs a temperature sensing signal that is indicative of the internal temperature of the optical receiver. The control unit 800 then retrieves the voltage level variation value in response to the temperature sensing signal from a predetermined table stored in a memory (not shown). The retrieved voltage level variation value is used to compensate the bit rate determined by the bit-rate discriminating unit 300 in order to compensate errors caused by a temperature variation inside of the optical receiver. After the compensation, the control unit sends a bit-rate change signal to the bit-rate signal generating unit 500. Thereafter, the bit rate signal generating unit 500 generates a reference clock in response to the bit-rate change signal. The function of the signal stabilizing unit 600 filters a locking signal outputted from the clock/data reproducing unit 400 (explained later). Meanwhile, the clock/data reproducing unit 400 receives the detected electrical signal and reproduces clocks and data based on the reference clock received from the bit-rate signal generating unit 500, then generates an appropriate clock signal to allow full recovery of the input signal.

Figure 4:
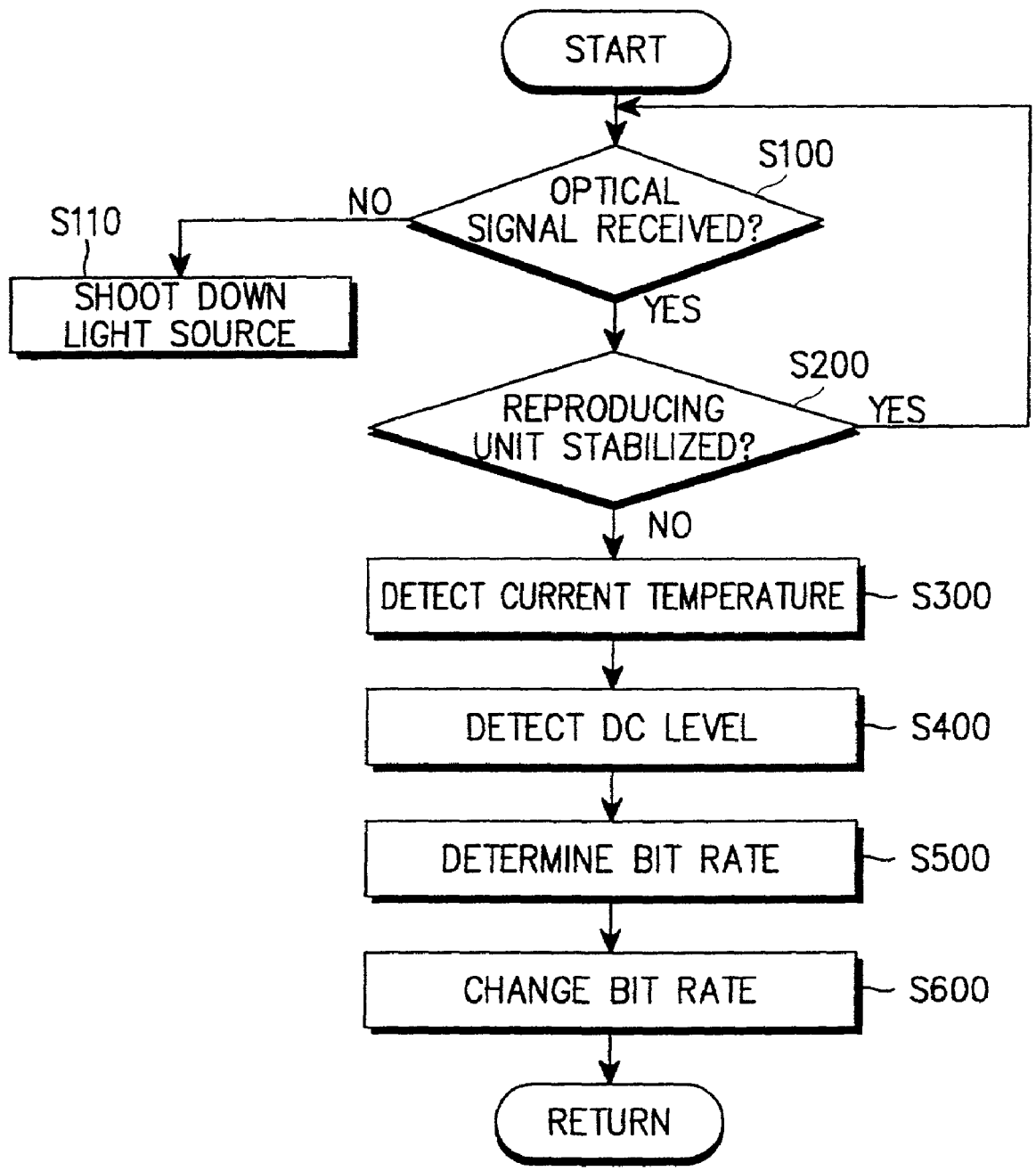

FIG. 4 is a flow chart illustrating a self-healing method according to a preferred embodiment of the present invention. As shown in FIG. 4, the self-healing method involves an optical signal reception determining step S100, a clock/data generating unit stabilization determining step S200, a current temperature detecting step S300, a DC level detecting step S400, a bit rate determining step S500, and a bit rate change signal outputting step S600.

In step S100, it is determined whether or not there is an optical signal received in the optical receiver based on whether there is an LOS signal. Where no optical signal is received, the procedure proceeds to a light source shootdown step S110.

In step S200, if it is determined that an optical signal is received, it is then determined whether the clock/data reproducing unit 400 is in a stabilized state based on whether there is a locking signal outputted from the clock/data reproducing unit 400. Where there is a PLL (Phase Locked Loop) locking signal outputted from the clock/data reproducing unit 400, it is determined that the clock/data reproducing unit 400 is in a stabilized state. However, if the "PLL loss of lock" signal is outputted from the clock/data reproducing unit, it is determined that the clock/data reproducing unit 400 is in a non-stabilized state.

If the clock/data reproducing unit 400 is in a non-stabilized state, the internal temperature of the optical receiver is detected based on the internal temperature sensing signal outputted from the temperature sensing unit 700 in step S300. Then, in step S400, the level of DC outputted from the bit rate discriminating unit 300 is detected.

In step S500, the bit rate of the detected electrical signal is determined based on the current internal temperature of the optical receiver detected at the current temperature detecting step S300 and the DC level detected at the DC level detecting step S400. A predetermined table with diverse temperatures and the corresponding diverse variations of the DC level is previously stored in a memory medium (not shown). That is, the temperature-dependent DC level variation table is a look-up table stored in the memory medium. As the DC level variation depending on the variation in temperature is taken into consideration at the bit rate determining step S500, it is possible to reduce errors associated with temperature change when determining the bit rate. Finally, in step S600 a bit rate change signal based on the bit rate determined at bit rate determining step S500 is outputted to the clock/data reproducing unit 400.

As apparent from the above description, the present invention provides a self-healing apparatus and method of an optical receiver, in which a variation in the DC level depending on the variation in the internal temperature of the optical receiver is taken into consideration when determining the bit rate of a receiving signal inputted to the optical receiver, thereby enabling the compensation of errors due to temperature variation when determining the bit rate.

While this invention has been described in connection with what is presently considered the most practical and preferred embodiment, the invention is not limited to the disclosed embodiment; to the contrary, it is intended to cover various modifications within the spirit and the scope of the appended claims.

What is claimed is:

1. An optical receiver for determining the bit rate of an optical signal, comprising: a converting unit for converting an input optical signal into an electrical signal; an amplifying unit, coupled to the converting unit, for amplifying the converted electrical signal outputted from the converting unit; a bit-rate discriminating unit for exclusively OR'ing the converted electrical signal with a delay signal delayed by a predetermined time, thereby outputting a recognition signal; a temperature sensing unit for outputting a temperature sensing signal that is indicative of an internal temperature of the optical receiver; a control unit for determining a bit rate of the converted electrical signal based on the voltage level of the converted electrical signal outputted from the bit rate discriminating unit and the temperature sensing signal; a bit-rate signal generating unit, coupled to the control unit, for generating a reference clock in response to the determined bit rate; and, a clock/data reproducing unit for receiving the converted electrical signal and for reproducing clocks and data based on the reference clock; and a signal stabilizing unit for filtering a locking signal outputted from the clock/data reproducing unit and for outputting the filtered signal to the control unit, the control unit being configured for the performing of the bit rate determining if the control unit determines, based on the filtered signal, that the clock/data reproducing unit is in a non-stabilized state; and, the control unit being configured for not performing the bit rate determining if the control unit determines, based on the filtered signal, that the clock/data reproducing unit is in a stabilized state.

2. The optical receiver according to claim 1, further comprising a memory having predetermined temperature-dependent voltage levels corresponding to the voltage level of the recognition signal outputted from the bit-rate discriminating unit.

3. An apparatus for determining the bit rate of an optical signal, comprising: a converter for converting the optical signal into a corresponding electrical signal; a discriminating unit, coupled to the converter, operative to converter, operative to generate a bit rate indications signal of the electrical signal; a sensing unit for providing a temperature sensing indicative of an internal temperature of the optical receiver; and, a control unit, coupled to an output of the discriminating unit, to determine a bit rate of the optical signal in response to the bit rate indication signal and the temperature sensing signal; a clock/data reproducing unit for receiving the electrical signal, reproducing clocks and data based on the reference clock, and outputting a locking signal; and a signal stabilizing unit for filtering the locking signal and for outputting the filtered signal to the control unit, the control unit being configured for the performing of the bit rate determining if the control unit determines, based on the filtered signal, that the clock/data reproducing unit is in a non-stabilized state; and the control unit being configured for not performing the bit rate determining if the control unit determines, based on the filtered signal, that the clock/data reproducing unit is in a stabilized state.

4. The optical receiver according to claim 3, wherein said clock/data reproducing unit further includes a signal stabilizing unit for filtering a locking signal outputted from the clock/data reproducing unit and for outputting the filtered signal to the control unit.

5. The optical receiver according to claim 3, wherein the control unit further includes a bit-rate signal generating unit for generating a reference clock in response to the determined bit rate.

6. A method for determining the bit rate of an optical signal using an optical receiver of the type having a temperature sensing unit, a bit rate discriminating unit, and a clock/data reproducing unit, the method comprising the steps of: determining whether or not the optical signal is detected in the optical receiver; converting the detected optical signal into an electrical signal; separating the electrical signal into a first part and a second part, the first part being forwarded to the bit rate discriminating unit and the second part being forwarded to the clock/data reproducing unit; determining whether the clock/data reproducing unit is in a stabilized state based on whether there is a locking signal outputted from the clock/data reproducing unit; detecting a current internal temperature of the optical receiver via the temperature sensing unit if it is determined that the clock/data reproducing unit is in a non-stabilized state; detecting the level of DC outputted from the bit rate discriminating unit; and, determining a bit rate of the electrical signal based on the detected current internal temperature of the optical receiver and the detected DC level; and not determining a bit rate of the electrical signal if it is determined that the clock/data reproducing unit is in a stabilized state.

7. The method according to claim 6, wherein detecting the level of DC outputted from the bit rate discriminating unit further includes the steps of: comparing the detected temperature to a predetermined table having temperature-dependent voltage levels; and, retrieving the corresponding voltage level responsive to the detected temperature.

8. The method according to claim 6, further including the step of utilizing the determined bit rate to generate a clock for recovering the electrical signal.

9. The method according to claim 6, further comprising the step of performing again the optical signal detection determining step if, in said determining whether the clock/data reproducing unit is in a stabilized state, it is determined that the reproducing unit is in a stabilized state.

* * * * *